(12) United States Patent
Deliwala

(10) Patent No.: US 12,379,305 B2
(45) Date of Patent: *Aug. 5, 2025

(54) OPTICAL IMPROVEMENTS TO COMPACT SMOKE DETECTORS, SYSTEMS AND APPARATUS

(71) Applicant: Analog Devices, Inc., Wilmington, MA (US)

(72) Inventor: Shrenik Deliwala, Andover, MA (US)

(73) Assignee: ANALOG DEVICES, INC., Wilmington, MA (US)

(*) Notice: Subject to any disclaimer, the term of this patent is extended or adjusted under 35 U.S.C. 154(b) by 1 day.

This patent is subject to a terminal disclaimer.

(21) Appl. No.: 18/325,746

(22) Filed: May 30, 2023

(65) Prior Publication Data

US 2023/0304917 A1 Sep. 28, 2023

Related U.S. Application Data

(63) Continuation of application No. 16/825,339, filed on Mar. 20, 2020, now Pat. No. 11,796,445.

(Continued)

(51) Int. Cl.
*G01N 15/1434* (2024.01)
*G01N 15/1429* (2024.01)
*G08B 17/107* (2006.01)

(52) U.S. Cl.
CPC ..... *G01N 15/1434* (2013.01); *G01N 15/1429* (2013.01); *G08B 17/107* (2013.01)

(58) Field of Classification Search
CPC .................................................. G08B 17/107
See application file for complete search history.

(56) References Cited

U.S. PATENT DOCUMENTS

D225,380 S 12/1972 Sanger
D238,154 S 12/1975 Tipton
(Continued)

FOREIGN PATENT DOCUMENTS

AT 502655 B1 5/2007
CN 205786299 U 12/2016
(Continued)

OTHER PUBLICATIONS

International Search Report and Written Opinion in PCT/US2018/35203, mailed Aug. 29, 2018, 11 pages.

(Continued)

*Primary Examiner* — Rufus L Phillips
(74) *Attorney, Agent, or Firm* — ArentFox Schiff LLP

(57) ABSTRACT

Device for improving an optical detecting smoke apparatus and implementing thereof. Apparatus and methods for detecting the presence of smoke in a small, long-lasting smoke detector are disclosed. Specifically, the present disclosure shows how to build one or more optimized blocking members in a smoke detector to augment signal to noise ratio. This is performed while keeping the reflections from the housing structure to a very low value while satisfying all the other peripheral needs of fast response to smoke and preventing ambient light. This allows very small measurements of light scattering of the smoke particles to be reliable in a device resistant to the negative effects of dust. In particular, geometrical optical elements, e.g., cap and optical deflection elements, are disclosed.

18 Claims, 9 Drawing Sheets

Related U.S. Application Data

(60) Provisional application No. 62/848,130, filed on May 15, 2019.

(56) References Cited

U.S. PATENT DOCUMENTS

| | | |
|---|---|---|
| 4,004,146 A | 1/1977 | Blunck |
| 4,075,614 A | 2/1978 | White |
| 4,148,022 A | 4/1979 | Hetznecker |
| 4,181,439 A | 1/1980 | Tresch et al. |
| 4,238,679 A | 12/1980 | Macmillan et al. |
| 4,306,230 A | 12/1981 | Forss et al. |
| D269,161 S | 5/1983 | Fenne |
| 4,430,646 A | 2/1984 | Enemark |
| RE32,105 E | 4/1986 | Enemark |
| D283,989 S | 5/1986 | Chen |
| D284,272 S | 6/1986 | Chen |
| 4,618,771 A | 10/1986 | Farren |
| 4,728,801 A | 3/1988 | O'Connor |
| D297,318 S | 8/1988 | Taylor |
| 4,857,895 A | 8/1989 | Kaprelian |
| 4,906,978 A | 3/1990 | Best et al. |
| D328,875 S | 8/1992 | Perkins |
| 5,181,439 A | 1/1993 | Schwartz |
| 5,351,034 A | 9/1994 | Berger et al. |
| 5,381,130 A | 1/1995 | Thuillard et al. |
| 5,382,341 A | 1/1995 | Aroutiounian et al. |
| 5,400,014 A | 3/1995 | Behlke et al. |
| 5,420,440 A | 5/1995 | Ketler et al. |
| 5,444,249 A | 8/1995 | Wong |
| 5,451,931 A | 9/1995 | Muller et al. |
| 5,497,144 A | 3/1996 | Schappi et al. |
| 5,568,129 A | 10/1996 | Sisselman et al. |
| D382,217 S | 8/1997 | Akiyama et al. |
| 5,689,114 A | 11/1997 | Miyazaki et al. |
| 5,781,291 A | 7/1998 | So et al. |
| D407,033 S | 3/1999 | Fors |
| 5,966,077 A | 10/1999 | Wong |
| 5,973,326 A | 10/1999 | Parry et al. |
| D434,686 S | 12/2000 | Denman |
| 6,194,735 B1 | 2/2001 | Martin |
| 6,225,910 B1 | 5/2001 | Kadwell et al. |
| 6,396,405 B1 | 5/2002 | Bernal et al. |
| 6,476,910 B1 | 11/2002 | Hermes |
| 6,521,907 B1 | 2/2003 | Shoaff et al. |
| 6,756,905 B2 | 6/2004 | Rattman et al. |
| 7,248,173 B2 | 7/2007 | Yamasaki et al. |
| 7,806,085 B1 | 10/2010 | Waddy |
| D653,576 S | 2/2012 | Thalhammer |
| D653,577 S | 2/2012 | Thalhammer |
| D653,578 S | 2/2012 | Thalhammer |
| 8,232,885 B2 | 7/2012 | Hoshino et al. |
| D665,289 S | 8/2012 | Thalhammer |
| 8,970,387 B2 | 3/2015 | Brigham et al. |
| 9,013,317 B2 | 4/2015 | Brigham et al. |
| 9,164,735 B2 | 10/2015 | Hux et al. |
| 9,196,141 B1 | 11/2015 | Schmidt et al. |
| D769,756 S | 10/2016 | Hojmose |
| 9,459,208 B2 | 10/2016 | Orsini et al. |
| 9,824,564 B2 | 11/2017 | Bressanutti et al. |
| 10,019,891 B1 | 7/2018 | Bajaj et al. |
| D874,964 S | 2/2020 | Bai et al. |
| 10,674,711 B2 | 6/2020 | Hutton |
| 10,697,880 B1 | 6/2020 | Hsieh et al. |
| 2001/0038338 A1 | 11/2001 | Kadwell et al. |
| 2002/0084907 A1 | 7/2002 | Rattman et al. |
| 2002/0089426 A1 | 7/2002 | Qualey, III et al. |
| 2003/0058117 A1 | 3/2003 | Mayusumi et al. |
| 2003/0209670 A1 | 11/2003 | Chang et al. |
| 2004/0063154 A1 | 4/2004 | Booth et al. |
| 2004/0072535 A1 | 4/2004 | Schneider et al. |
| 2004/0188598 A1 | 9/2004 | Kawai |
| 2005/0077489 A1 | 4/2005 | Knapp et al. |
| 2005/0173638 A1 | 8/2005 | Powell |
| 2007/0013883 A1 | 1/2007 | Park |
| 2007/0221848 A1 | 9/2007 | Johnson et al. |
| 2007/0242269 A1 | 10/2007 | Trainer |
| 2008/0246623 A1 | 10/2008 | Nagashima |
| 2008/0258903 A1 | 10/2008 | Le et al. |
| 2008/0266558 A1 | 10/2008 | Hess et al. |
| 2008/0316489 A1 | 12/2008 | Ludwig |
| 2009/0213380 A1 | 8/2009 | Appel et al. |
| 2009/0235720 A1 | 9/2009 | Smith |
| 2009/0268204 A1 | 10/2009 | Tkachuk |
| 2011/0042570 A1 | 2/2011 | Wong |
| 2011/0149198 A1 | 6/2011 | Kim et al. |
| 2011/0178420 A1 | 7/2011 | Ridder et al. |
| 2012/0135405 A1 | 5/2012 | Toumbas et al. |
| 2012/0140231 A1 | 6/2012 | Knox et al. |
| 2012/0267532 A1 | 10/2012 | Udrea et al. |
| 2013/0008787 A1 | 1/2013 | Mammoto et al. |
| 2013/0051062 A1 | 2/2013 | Lee et al. |
| 2013/0071290 A1 | 3/2013 | Goldstein et al. |
| 2013/0135607 A1 | 5/2013 | Wedler et al. |
| 2013/0286393 A1 | 10/2013 | Erdtmann |
| 2014/0070101 A1 | 3/2014 | Matsushima et al. |
| 2014/0168647 A1 | 6/2014 | Ju et al. |
| 2015/0129767 A1 | 5/2015 | Kouznetsov et al. |
| 2015/0219491 A1 | 8/2015 | Lee et al. |
| 2015/0300938 A1 | 10/2015 | Debreczeny et al. |
| 2015/0377711 A1 | 12/2015 | Steffanson et al. |
| 2016/0033307 A1 | 2/2016 | Yanobe |
| 2016/0042638 A1 | 2/2016 | Sangha et al. |
| 2016/0153905 A1 | 6/2016 | Allemann et al. |
| 2017/0046935 A1 | 2/2017 | Allemann et al. |
| 2017/0169682 A1 | 6/2017 | Bressanutti et al. |
| 2017/0191930 A1 | 7/2017 | Warren et al. |
| 2017/0241904 A1 | 8/2017 | Barritault et al. |
| 2017/0261425 A1* | 9/2017 | Deliwala ............... G01N 33/18 |
| 2018/0348121 A1 | 12/2018 | Deliwala |
| 2018/0365955 A1 | 12/2018 | Bajaj et al. |
| 2020/0209158 A1 | 7/2020 | Nikolaenko et al. |
| 2021/0072082 A1 | 3/2021 | Valouch et al. |

FOREIGN PATENT DOCUMENTS

| | | |
|---|---|---|
| CN | 206441309 U | 8/2017 |
| DE | 102010031139 A1 | 1/2012 |
| DE | 202015000820 U1 | 3/2015 |
| EP | 896216 A2 | 2/1999 |
| EP | 2492882 A1 | 8/2012 |
| EP | 3270362 A1 | 1/2018 |
| GB | 2000282 A | 1/1979 |
| GB | 2270157 A | 3/1994 |
| GB | 2397122 A | 7/2004 |
| JP | H09229858 A | 9/1997 |
| JP | 2002162626 A | 6/2002 |
| JP | 1364184 S | 7/2009 |
| JP | 2011014593 A | 1/2011 |
| JP | 2014010148 A | 1/2014 |
| JP | 1410148 S | 3/2014 |
| KR | 3003794520000 | 4/2005 |
| KR | 200421772 Y1 | 7/2006 |
| KR | 3006241260000 | 12/2011 |
| KR | 3006324530000 | 2/2012 |
| KR | 20120130957 A | 12/2012 |
| TW | 565384 | 12/2003 |
| TW | 566634 U | 12/2003 |
| TW | 596351 | 6/2004 |
| TW | D091390 | 12/2004 |
| TW | 201237811 A | 9/2012 |
| TW | D151506 | 1/2013 |
| TW | 201434015 A | 9/2014 |
| WO | 9914576 A2 | 3/1999 |
| WO | 195279 A1 | 12/2001 |
| WO | 2016150613 A1 | 9/2016 |
| WO | 2016186884 A1 | 11/2016 |
| WO | 2017021217 A1 | 2/2017 |

(56) References Cited

OTHER PUBLICATIONS

Office Action in U.S. Appl. No. 16/825,339, mailed May 19, 2021, 27 pages.

\* cited by examiner

OPTICAL IMPROVEMENTS TO COMPACT SMOKE DETECTORS, SYSTEMS AND APPARATUS

CROSS-REFERENCE TO RELATED APPLICATIONS

This application is continuation application of U.S. patent application Ser. No. 16/825,339, entitled, "OPTICAL IMPROVEMENTS TO COMPACT SMOKE DETECTORS, SYSTEMS AND APPARATUS", filed on Mar. 20, 2020, which claims priority to U.S. Provisional Patent Application No. 62/848,130 entitled, "OPTICAL IMPROVEMENTS TO COMPACT SMOKE DETECTORS, SYSTEMS AND APPARATUS" filed on May 15, 2019, and which is related to U.S. patent application Ser. No. 16/181,878 entitled, "COMPACT OPTICAL SMOKE DETECTOR SYSTEM AND APPARATUS" filed on Nov. 6, 2018, U.S. patent application Ser. No. 16/206,268 entitled, "SMOKE DETECTOR CHAMBER BOUNDARY SURFACES" filed on Nov. 30, 2018, now U.S. Pat. No. 10,809,173, U.S. patent application Ser. No. 15/993,188 entitled, "COMPACT OPTICAL GAS DETECTION SYSTEM AND APPARATUS" filed on May 30, 2018, now U.S. Pat. No. 10,866,185, and U.S. patent application Ser. No. 16/699,677 entitled, "FIRE DETECTION SYSTEM" filed on Dec. 1, 2019, all of which are hereby incorporated by reference in their entirety.

FIELD OF THE DISCLOSURE

The present disclosure relates to smoke detection. More specifically, this disclosure describes apparatus and techniques relating to improvements in reflection angles received in a compact smoke detector, while blocking light from impinging on undesired surfaces.

BACKGROUND

A smoke detector is a device that senses smoke, typically as an indicator of fire. Commercial security devices issue a signal to a fire alarm control panel as part of a fire alarm system, while household smoke detectors, also known as smoke alarms, generally issue a local audible or visual alarm from the detector itself.

Smoke detectors are housed in plastic enclosures, typically shaped like a disk about 150 millimeters (6 in) in diameter and 25 millimeters (1 in) thick, but shape and size vary. Smoke can be detected either optically (photoelectric) or by physical process (ionization), detectors may use either, or both, methods. Sensitive alarms can be used to detect, and thus deter, smoking in areas where it is banned. Smoke detectors in large commercial, industrial, and residential buildings are usually powered by a central fire alarm system, which is powered by the building power with a battery backup.

Domestic smoke detectors range from individual battery-powered units, to several interlinked mains-powered units with battery backup; with these interlinked units, if any unit detects smoke, all trigger even if household power has gone out. Optical smoke detectors tend to be larger in size. And consequently, 90% of domestic smoke detectors using ionization technology.

While ionization smoke alarms are generally more responsive to flaming fires, photoelectric smoke alarms are generally more responsive to fires that begin with a long period of smoldering (called "smoldering fires"). For each type of smoke alarm, the advantage it provides may be critical to life safety in some fire situations. Home fatal fires, day or night, include a large number of smoldering fires and a large number of flaming fires. One cannot predict the type of fire one may have in a home or when it will occur. Any smoke alarm technology, to be acceptable, must perform acceptably for both types of fires in order to provide early warning of fire at all times of the day or night and whether one is asleep or awake.

An ionization smoke detector uses a radioisotope, typically americium-241, to ionize air; a difference due to smoke is detected and an alarm is generated. The smoke detector has two ionization chambers, one open to the air, and a reference chamber which does not allow the entry of particles. The radioactive source emits alpha particles into both chambers, which ionizes some air molecules.

There is a potential difference (voltage) between pairs of electrodes in the chambers; the electrical charge on the ions allows an electric current to flow. The currents in both chambers should be the same as they are equally affected by air pressure, temperature, and the ageing of the source. If any smoke particles enter the open chamber, some of the ions will attach to the particles and not be available to carry the current in that chamber. An electronic circuit detects that a current difference has developed between the open and sealed chambers, and sounds the alarm.

A photoelectric, or optical smoke detector contains a source of infrared, visible, or ultraviolet light (typically an incandescent light bulb or light-emitting diode), a lens, and a photoelectric receiver (typically a photodiode). In spot-type detectors all of these components are arranged inside a chamber where air, which may contain smoke from a nearby fire, flows. In large open areas such as atria and auditoriums, optical beam or projected-beam smoke detectors are used instead of a chamber within the unit: a wall-mounted unit emits a beam of infrared or ultraviolet light which is either received and processed by a separate device, or reflected back to the receiver by a reflector.

In some types, particularly optical beam types, the light emitted by the light source passes through the air being tested and reaches the photosensor. The received light intensity will be reduced by absorption due to smoke, air-borne dust, or other substances; the circuitry detects the light intensity and generates the alarm if it is below a specified threshold, potentially due to smoke. In other types, typically chamber types, the light is not directed at the sensor, which is not illuminated in the absence of particles. If the air in the chamber contains particles (smoke or dust), the light is scattered and some of it reaches the sensor, triggering the alarm.

As stated, ionization detectors are more sensitive to the flaming stage of fires than optical detectors, while optical detectors are more sensitive to fires in the early smoldering stage. Fire safety experts and the National Fire Protection Agency recommend installing what are called combination alarms, which are alarms that either detect both heat and smoke, or use both the ionization and photoelectric processes. Combination alarms that include both technologies in a single device are available, with some even including a carbon monoxide detection capability.

Unfortunately, the size and/or footprint of optical smoke detectors make them impermissible for the vast majority of home use, as well as a large proportion of business use. The inventor of the present disclosure has identified these shortcomings and recognized a need for a more compact, robust optical smoke detector system. That is, an optical smoke detector which is small enough for ubiquitous use while being robust enough for years of long life maintaining a sensitive state.

Recent changes in standardized test of smoke detectors have proven very difficult to overcome. Specifically, those of Underwriter's Laboratory (UL) and corresponding nuisance test applied to optical smoke detectors. Furthermore, changes in some countries' laws will require smoke detectors in all buildings upon enaction. Additionally, a demand in the state of the art exists, and the inventor of the present disclosure has recognized this.

Many techniques have been proposed which typically consist of a broadband light source. Unfortunately, they require relatively long optical paths which reduce light collection efficiencies. The inventor of the present disclosure has identified these shortcomings and recognized a need for a more elegant, robust, compact optical smoke detection measurement system with high collection efficiency. That is, the inventor has come up with a compact, low-power, optical smoke detection apparatus which can be mass produced via packaging without yielding accuracy.

Accordingly, there is a need for new, robust smoke detectors having longevity with a small footprint. The inventors of the present disclosure have identified these shortcomings and recognized a need for a new safety equipment which is easily implemented into manufacturing.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

SUMMARY OF THE DISCLOSURE

Apparatus and methods for detecting the presence of smoke in a small, long-lasting smoke detector are disclosed. Specifically, the present disclosure shows how to build optimized blocking members in a smoke detector to augment signal to noise ratio. This is performed while keeping the reflections from the housing structure to a very low value while satisfying all the other peripheral needs of fast response to smoke and preventing ambient light. This allows very small measurements of light scattering of the smoke particles to be reliable in a device resistant to the negative effects of dust. In particular, geometrical optical elements, e.g., cap and optical defection elements, are disclosed.

According to one aspect, the present disclosure is an apparatus for identifying smoke using optical analysis techniques described herein. Specifically, the apparatus is disposed in an optical smoke detector and identification is executed within.

According to another aspect of the device, light is transmitted through the air through which it is scattered by the smoke particles.

According to another aspect, the scattered light is incident upon on or more detectors, each of which are disposed at various distance relative to a light source from the light was transmitted.

According to another aspect, the ratio(s) of detected light is used to determine the presence of smoke.

According to yet another aspect, the apparatus utilizes logic which when executed performs the steps in receiving the light information and making a smoke determination.

According to another aspect of the present disclosure, the apparatus further comprises a cap disposed substantially orthogonal the first light source.

According to another aspect of the present disclosure, the cap is shaped substantially like a conic section, at least in part.

According to another aspect of the present disclosure, the cap the conic section is a parabola, at least in part.

According to another aspect of the present disclosure, the cap the conic section is an ellipse, at least in part.

According to another aspect of the present disclosure, the cap's tip is disposed at a position which is not in direct illumination from a light emitting diode (LED).

According to another aspect of the present disclosure, the apparatus further comprises a first light emitting diode have a spectral intensity centered about a first wavelength, $\lambda 1$.

According to another aspect of the present disclosure, the apparatus further comprises an array of optical deflection elements disposed substantially in a circle around the outer radius of the cap.

According to another aspect of the present disclosure, the apparatus further comprises an anti-reflective coating disposed on at least one of cap and array of optical deflection elements.

According to another aspect of the present disclosure, the coating is centered about the first wavelength, $\lambda 1$.

According to another aspect of the present disclosure, the apparatus further comprises a substrate in which the cap is mechanically coupled thereto.

According to another aspect of the present disclosure, the array of optical deflection elements is substantially wing-shaped.

According to another aspect, the present disclosure comprises an analog front-end in electrical communication with one or more photodetectors.

According to yet another aspect of the invention, more than one light source is used, each having wavelengths centered at different frequencies.

According to yet another aspect of the invention, each wavelength contributes to the determination of the presence of smoke.

According to yet another aspect of the invention, a plurality of lossy members surrounds the center of the detector chamber.

According to yet another aspect of the invention, the plurality of lossy members is substantially configured to be columns.

According to yet another aspect of the invention, the plurality of lossy members is substantially configured to be wing-like features resembling cooling fins.

According to yet another aspect of the invention, the plurality of lossy members is substantially configured to have index of refraction close to that of household dust.

According to yet another aspect of the invention, the plurality of lossy members also has an imaginary part of the complex impedance which is lossy. This serves not only to mitigate reflections (impedance matching) but absorb power (lossy medium) from ambient light which can give false smoke detector positives.

According to another aspect of the invention, the compact smoke detector can be comprised by an a single analog front-end (AFE).

According to another aspect of the invention, the compact smoke detector and single analog front-end (AFE) can be fabricated from a plurality of dies on a substrate.

According to another aspect of the invention, the compact smoke detector can use one or more optical filters.

According to yet another aspect of the invention, the compact smoke detector can use the one or more optical filters. Specifically, the optical filter can include an absorptive filter and/or interference or dichroic filters.

According to another aspect of the invention, a smoke or light scattering detection system is disclosed comprising a specific placement of light sources and detectors such that one or more light sources (LS) and detectors (PD) lie in the same plane.

According to another aspect of the invention, a smoke or light scattering detection system, wherein the one or more light sources and detectors are configured to be separated by a small barrier (B).

According to another aspect of the invention, a smoke or light scattering detection system, wherein the one or more light sources and detectors are configured to be separated by other barriers or optics to control the direction of light rays emanating from the light source to avoid direct illumination of light from the light source to the detectors.

According to another aspect of the invention, a smoke or light scattering detection system, wherein the signal generated by the photodetector from the scattering is predominantly weighted by scattering at angles less than 90 degrees to the incident light rays (the scattering angle).

According to another aspect of the invention, a smoke or light scattering detection system, wherein the one or more light sources and photodetectors are disposed in a common substrate.

According to another aspect of the invention, a smoke or light scattering detection system further comprises multiple light sources of different wavelengths.

According to another aspect of the invention, a smoke or light scattering detection system further comprises multiple detectors to generate different scattering angle weighted output signals.

According to another aspect of the invention, a smoke or light scattering detection system further comprises an electronic circuit to generate electrical stimulus for light source and the detection circuits to process the photodetector signals.

According to another aspect of the invention, a smoke or light scattering detection system, wherein the placement of photodetectors is configured to also receive scattered light at angles greater 90 degrees.

According to another aspect of the invention, a smoke or light scattering detection system further comprises lenses and other optical surfaces including barriers to provide higher signal by more efficiently collecting the light from the light source.

According to another aspect of the invention, a smoke or light scattering detection system comprises multiple photodetectors to provide different weighted angle distribution of scattered light.

According to another aspect of the invention, a smoke or light scattering detection system comprises multiple light emitting diodes of different wavelength.

According to another aspect of the present disclosure, the opto-electronic package for measurement of absorption of light further comprises that the package is constructed with "base package" that can be tested separately from the gas chamber and the two combined by assembly to form the complete gas detection system.

The drawings show exemplary smoke detector circuits and configurations. Variations of these circuits, for example, changing the positions of, adding, or removing certain elements from the circuits are not beyond the scope of the present invention. The illustrated smoke detectors, configurations, and complementary devices are intended to be complementary to the support found in the detailed description.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

For a fuller understanding of the nature and advantages of the present invention, reference is made to the following detailed description of preferred embodiments and in connection with the accompanying drawings, in which.

DETAILED DESCRIPTION

Figure 1:
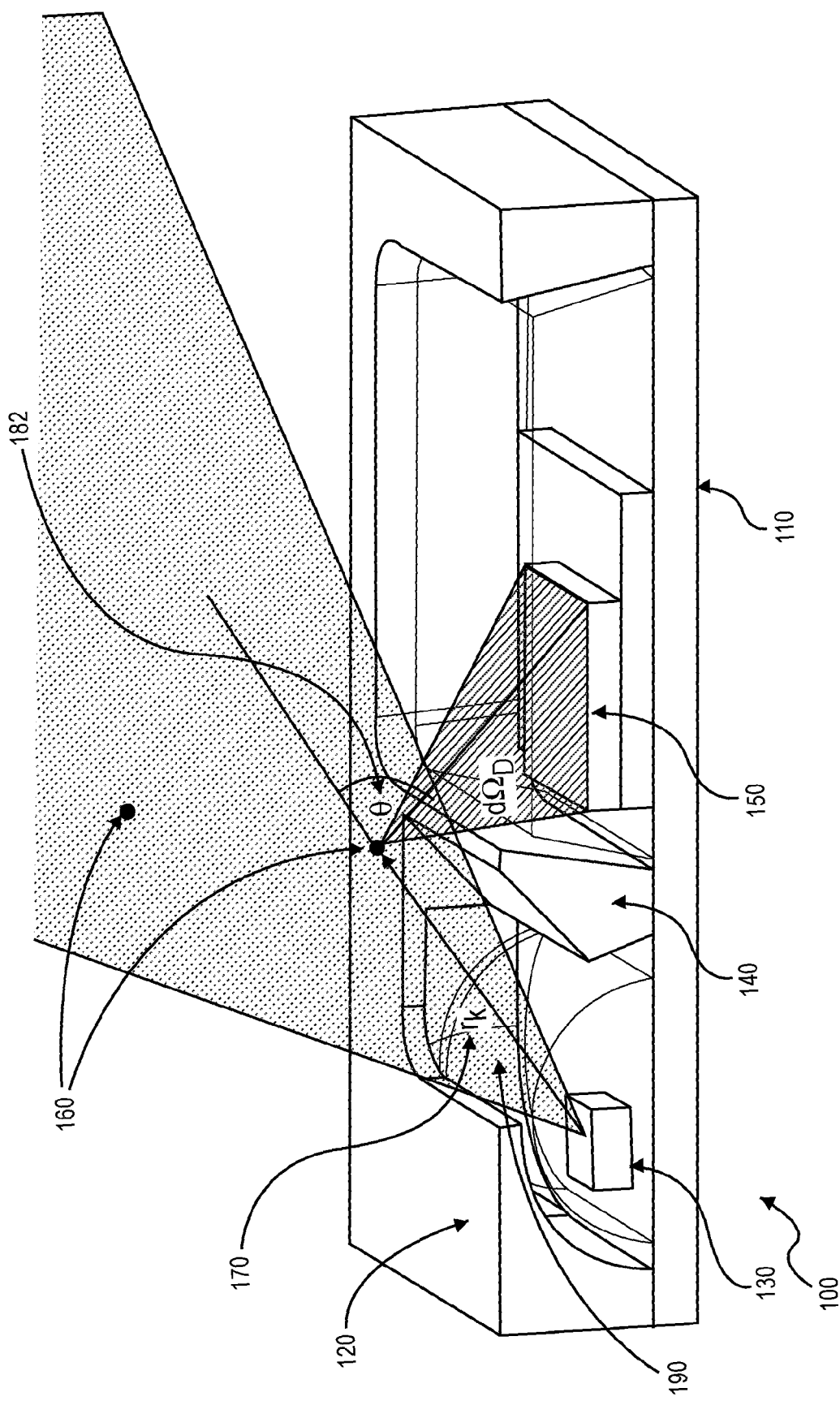
FIG. 1 shows an isometric view of an exemplary optical smoke detector with blocking members, in accordance with some embodiments of the disclosure provided herein.
Figure 2A:
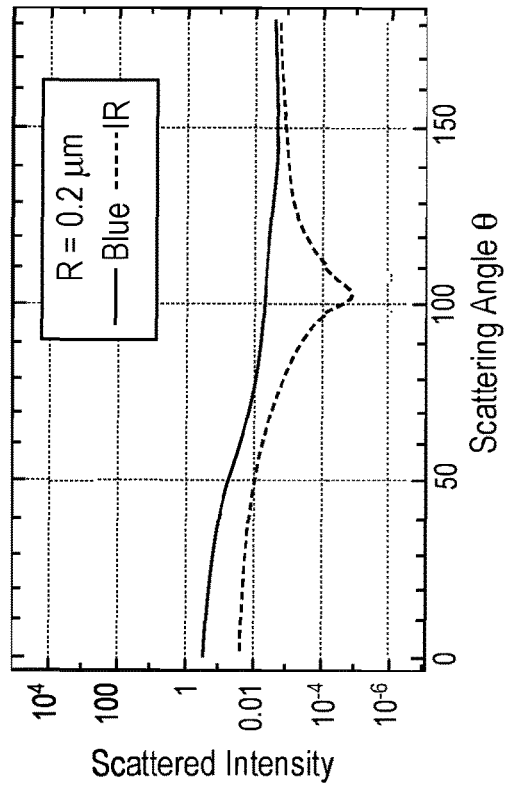
FIGS. 2A-2D are exemplary graphs representing scattered light as a function of angle, theta, and the resultant light receive at a photodetector, within an exemplary smoke detector, in accordance with some embodiments of the disclosure provided herein.
Figure 2B:
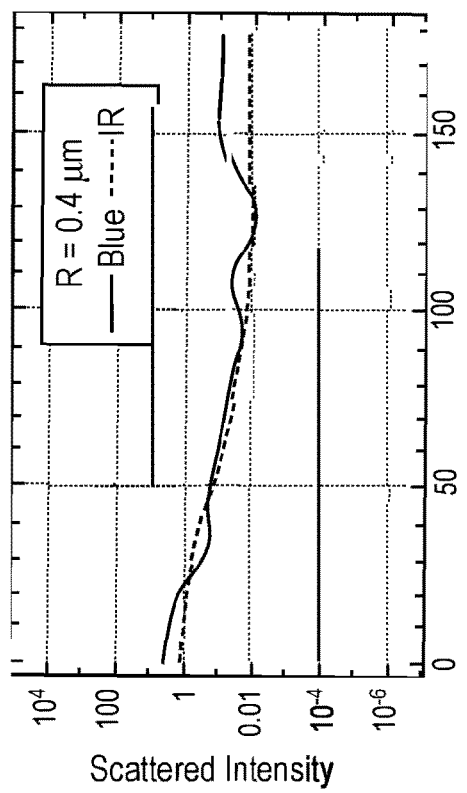
Figure 2C:
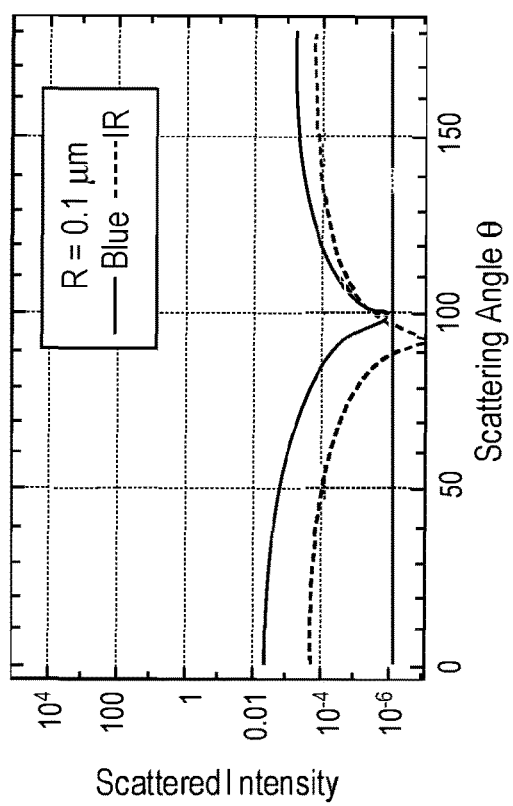
Figure 2D:
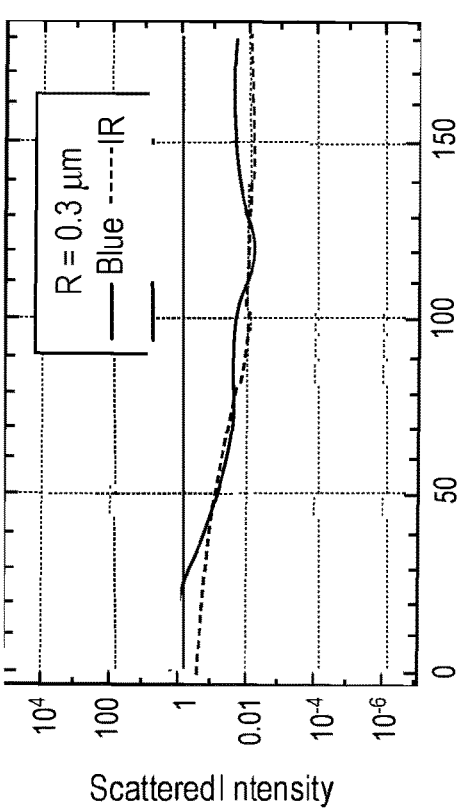
Figure 3A:
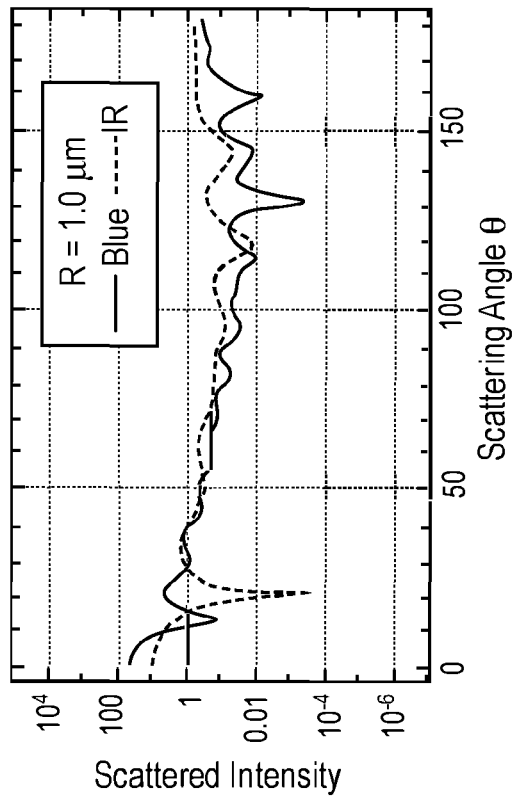
FIGS. 3A-3D are exemplary graphs representing scattered light as a function of angle, theta, and the resultant light receive at a photodetector, within an exemplary smoke detector, in accordance with some embodiments of the disclosure provided herein.
Figure 3B:
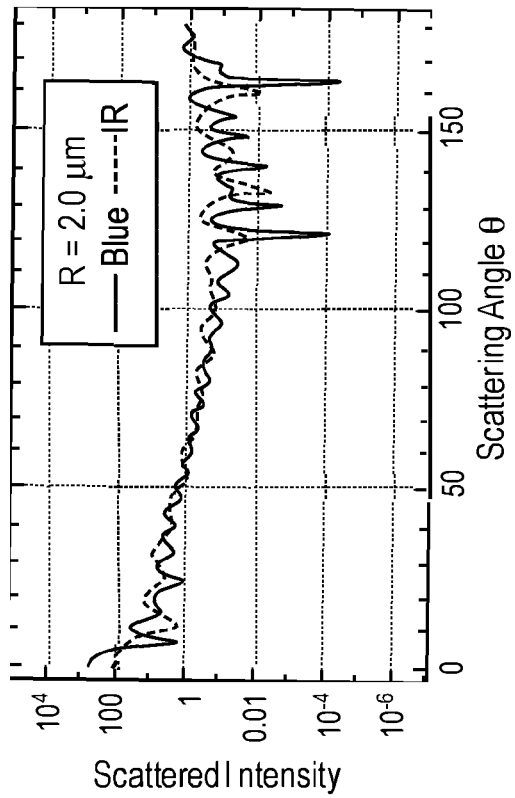
Figure 3C:
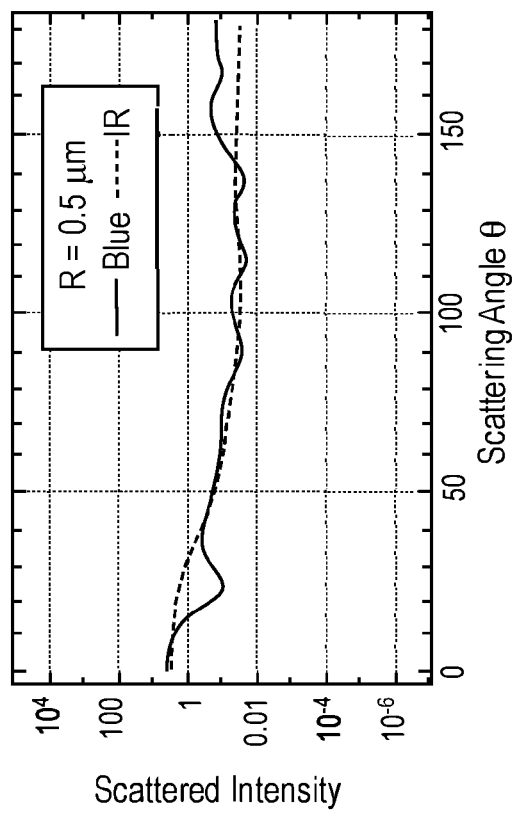
Figure 3D:
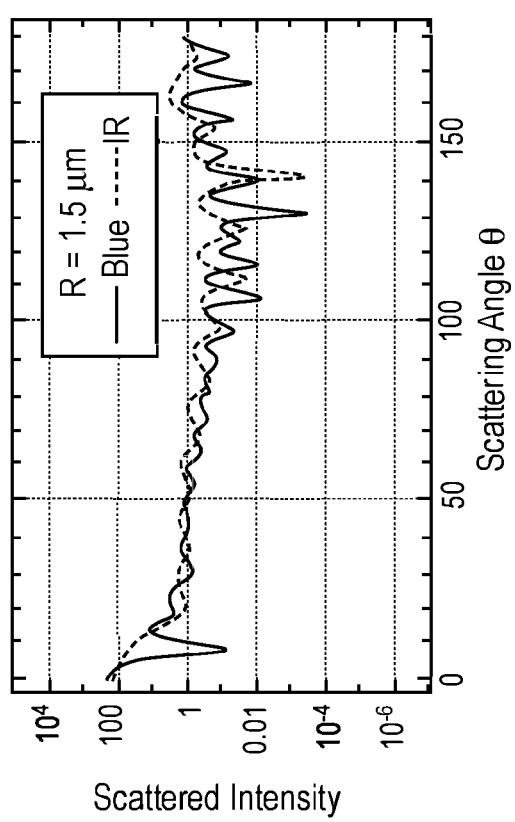
Figure 4A:
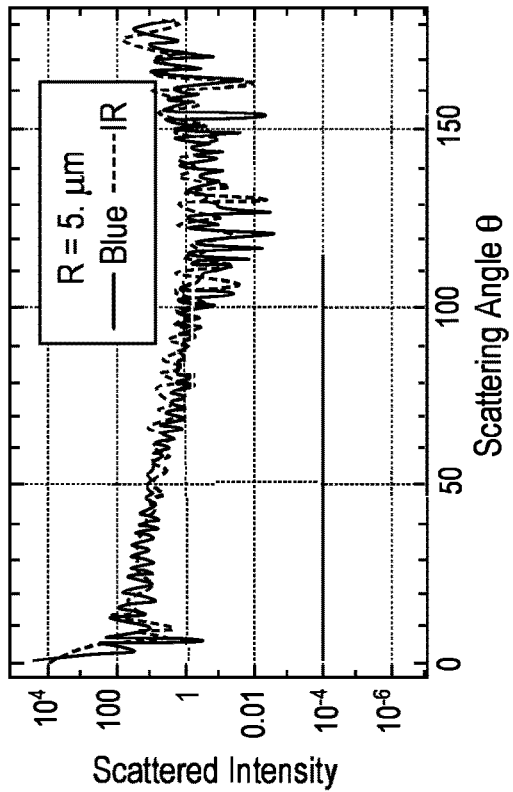
FIGS. 4A-4D are exemplary graphs representing scattered light as a function of angle, theta, and the resultant light receive at a photodetector, within an exemplary smoke detector, in accordance with some embodiments of the disclosure provided herein.
Figure 4B:
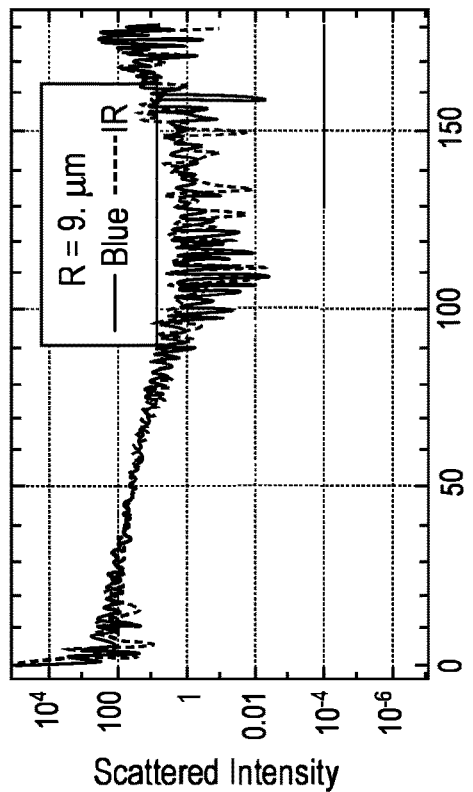
Figure 4C:
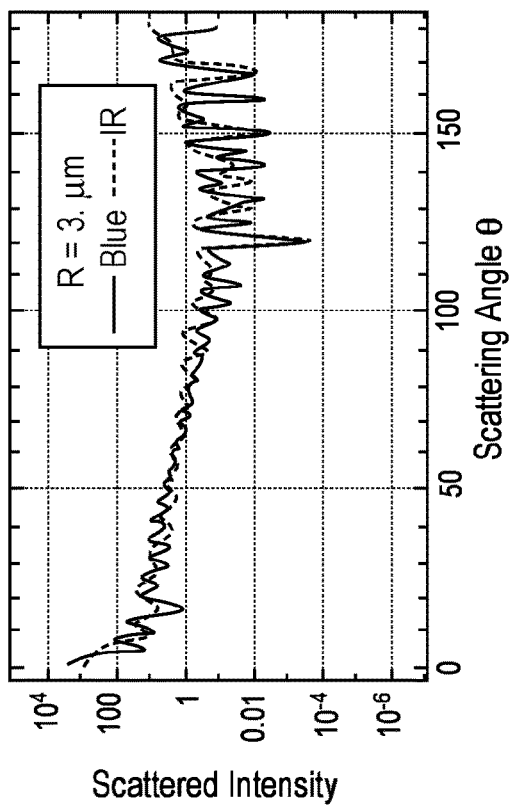
Figure 4D:
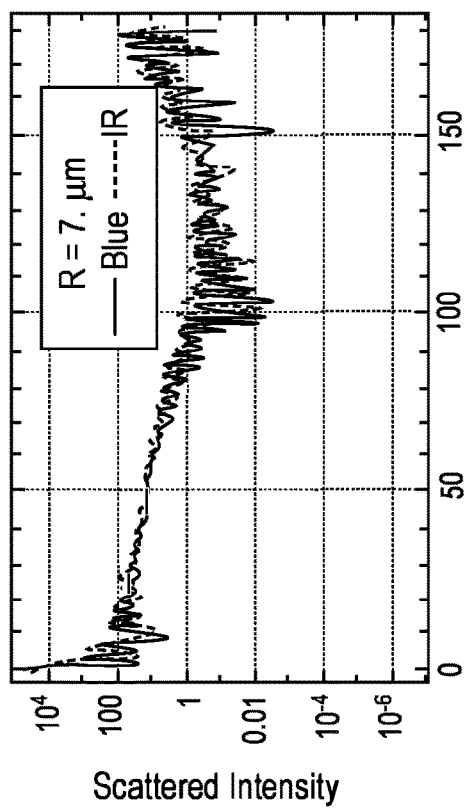

The present disclosure relates to smoke detection. More specifically, this disclosure describes apparatus and techniques relating to improvements in reflection angles received in a compact smoke detector, while blocking light from impinging on undesired surfaces.

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure are set forth in the proceeding in view of the drawings where applicable.

Fires can occur in a variety of ways. The two most common forms of fires are slow smoldering fires and fast flaming fires. A smoldering fire is a slow, low-temperature, flameless form of combustion. These fires develop slowly and generate a significant amount of smoke which is easily detected by an optical smoke detector. Smoldering fires are typically initiated on upholstered furniture by weak heat sources such as cigarettes or an electrical short-circuit.

Fast flaming fires develop rapidly, typically generating black smoke and toxic fumes and leave little time for escape. The characteristic temperature and heat released during smoldering (typically 600° C.) are low compared to those in a fast flaming fire (typically 1500° C.). Fast flaming fires propagate typically about ten times faster than smoldering fires. However, smoldering fires emit a high level of toxic gases such as carbon monoxide. These gases are highly inflammable and could later be ignited in the gas phase, triggering the transition to flaming combustion.

Smoke detectors for detecting smoke through detection of scattered light by smoke particles have conventionally been proposed and put into practice. Such a smoke detector detects a fire as follows. The smoke detector has a dark chamber for storing a photo emitter and a photo detector. Light emitted from the photo emitter is scattered by smoke particles having flowed into the dark chamber, to thus generate scattered light. The photo detector receives the scattered light.

Optical type smoke alarms have several systemic and operational disadvantages when compared with ionization type smoke alarms. In recent years, smoke detectors including light traps for inhibiting noise light (light generated by reflection, by an inner wall of the dark chamber, of light having been emitted from the photo emitter) from reaching the photo detector have been proposed.

There are in general two types of noise light—one caused by unwanted reflections from nearby surfaces of the light emitted from the photo emitter and other ambient light that leaks into the smoke chamber. Both of these lights need to be avoided since there is no way for the photodetector to decide whether light is caused by reflection or from scattering or from the ambient. When such a smoke detector is adopted, one must design the optical and electrical system to avoid false triggering by noise light. The inventors of the present disclosure have recognized how to improve on both fronts while reducing the size, cost, and adding to the aesthetics.

However, in such a smoke detector, the light trap is disposed in front of the photo emitter and the photo detector. Therefore, light emitted from the photo emitter is reflected in a direction parallel to a virtual plane including an optical axis of the photo emitter and that of the photo detector. Accordingly, since noise light is easily incident to a light detecting region, occurrence of a false alarm remains highly possible.

Some smoke detectors employ a labyrinth structure for inhibiting light from entering the dark chamber. Since light emitted from the photo emitter is reflected by edge sections of wall members constituting the labyrinth structure, irregular noise light of an amount that cannot be sufficiently attenuated by the light trap is generated. Therefore, the noise light may enter the light detecting region, to thus cause a false alarm.

In addition, within these type of smoke detectors, a plurality of light traps must be disposed and, a light trap must be disposed inside the labyrinth structure within the dark chamber. Accordingly, either case requires a large space for disposing the light trap, whereby miniaturization of the smoke detector has encountered difficulty. Also, some smoke detectors include another member such as a lens in addition to the light trap, whereby the cost for manufacturing the smoke detector may be increased. Furthermore, the light trap and/or the lens may inhibit smoke from flowing into the dark chamber.

In addition to larger footprint, relative to ionization alarms, optical detection devices suffer from confirmation during the course of their service. Both optical smoke alarms which use an infra-red emitter light emitting diode and ionization type smoke alarms are used in the detection of both types of fires and rely upon a flux of ambient air passing through them. In some devices (as in one or more of the foregoing embodiments), fans are employed to facilitate the passage of air through them. However, dust and particulate matter can collect and contaminate some of their device elements. These surfaces become more reflective in all directions so that any light falling on these surfaces can now be scattered into the photodetector in a manner similar to the smoke.

Still, optical detection systems are favored over ionization type systems in certain circumstances. For example, optical systems better detect smoldering fires. Additionally, ionization alarms have the disadvantage that, as they contain radioactive isotopes in their sensors, they are subject to regulations concerning their manufacture and disposal. These regulations depend upon the country but can place a considerable burden on the manufacturer.

Optical smoke detectors tend to be large, expensive devices which degrade with age from contamination, giving off false positives. The inventor of the present disclosure has recognized the need for a more robust optical smoke detector, which is on the size order with that of the ubiquitous household ionization unit and is relatively insensitive to the threat of dust and other particulate contamination. Furthermore, the optical surfaces within the chamber itself play an important part to this this end.

FIG. 1 shows an isometric view of an exemplary optical smoke detector 100 with blocking members, in accordance with some embodiments of the disclosure provided herein. Optical smoke detector 100 comprises light emitting diode 130, substrate 110, septum 140, blocking member 120, and photodetector 150.

Turning to FIG. 1, smoke detector comprises two barriers, septum 140 and blocking member 120, to shape the output light rays emerging from the light emitting diode 130 based light source. Septum 140 represents a coplanar barrier between the light emitting diode and photodetector. The barrier has a specific shape to allows tilted rays from the light emitting diode cavity that will traverse over the photodetector cavity which then scatter from the smoke particles 160.

Distance $r\kappa$ κ 170 is the distance to the smoke particle. Smoke particles 160 that are very close to the module scatter rays 190 that make very low scattering angle θ 182 and very large collection solid angle dΩ to the detector. Since the closer to the photodetector cavity rays 190 carry more light intensity owing to the proximity to the detector and the light source, the signal from these rays is overwhelmingly represented in the total signal.

With respect to the present disclosure, blocking member 120 prevents vertical light rays and thus only smoke particles in a well-defined cone (rays 190) contribute to the signal. Specifically, this is represented to a packaging overhang which prevents direct light from impinging on the center point of the cap/upper boundary surface.

As a result, this automatically reduces the average scattering angle. As is shown, the barrier, blocking member 120, also provides us with ability to design an enclosing chamber to prevent light rays from reflected from other near-by surfaces that must invariably be present to enclose the smoke detection region. This simple feature reduces scattering from dust as it collects over the years on nearby chamber surfaces and allows for easier calibration of smoke alarm thresholds by reducing the background from the chamber.

Thus, barriers, septum 140 and blocking member 120, work together to shape the light rays. Note that curved molded surfaces can also be used in conjunction with barriers to improve light shaping efficiency. The module of FIG. 1 does have curved molded surface surrounding the light emitting diode. There are many ways in which barriers, septum 140 and blocking member 120 can be arranged to predominantly shape the light beam to be inclined towards photodetector. Note that any direct rays from light emitting diode 130 to photodetector will rapidly reduce the ability to measure much smaller scattered light.

The light received from a single scattering event from a particle of smoke of type t at a distance $r_k$ is given by:

$$Mt(rk) \propto \left(\frac{L(rk)}{r_k^2}\right) \int \Omega D \; nt(s)\sigma t(s, \theta, \lambda) ds \quad (1)$$

Where $n_t(s)$ is the particle size distribution for the smoke type t and represents the number of particles of size $s_i$, $\sigma$ (s, $\theta$, $\phi$, $\lambda$) is the particle scattering cross section that depends on the particle size, angle of scattering and the wavelength of light. The scattering angle $\theta\phi$ depends on the location of the particle $r_k$ and location of the photodetector. This is the term $$\frac{L(rk)}{r_k^2}$$

represents reduction in intensity from the light source as well as angular light source profile. Note that the bounds of the integral $\Omega_D$ which is the solid angle made by the detector to the scattering particle is itself a function of location of the particle $r_k$.

The overall signal received by the detector is of course from all particles at all possible distances. This is given by:

$$St = \int Mt(r) d^3 r \quad (2)$$

One can readily carryout these integrals for spherical particles using Mie scattering theory and calculate the average scattering angles and effect of changing the light source distribution. The light source distribution is varied by changing the geometry of the barriers while making sure that no direct light rays from the light emitting diode reach the photodetector. The average scattering angle is computed by using equations (1) and (2).

$$\langle \theta \rangle = \frac{\int \theta(r) Mt(r) d^3 r}{St} \quad (3)$$

In the present embodiment, the light source is a light emitting diode (LED), such as, an off-the-shelf green (495 nm-570 nm) light emitting diode. However, other embodiments can have light emitting diodes having a longer wavelength, such as that in the infrared regime. In yet other embodiments, a plurality of multiple wavelengths can be used. Any suitable, compact light producing device is not beyond the scope of the present disclosure-whether, broadband lamps, coherent, incandescent, incoherent bulb, lasers, or even thermal black-body radiation, etc.

Septum 140 is an opto-isolator which traverses the entire span between the light emitting diode 130 side and the photodetector 150 side of the device. The function of the septum 140 is to block light from being directly received by photodetector 150. As such, septum 130 are made from an opaque polymer and/or lossy material having a thickness much greater than the average skin depth, according to some embodiments of the present invention. High conductivity (mirrored) are also not beyond the scope of the present disclosure, however, this is not a preferred embodiment as will be clear later in the disclosure.

Photodetector (PD) 150 is a sensor of light or other electromagnetic energy. In some embodiments, photodetector 150 have p-n junctions that converts light photons into current. The absorbed photons make electron-hole pairs in the depletion region, which is used to detect received light intensity. In some embodiments, photodetectors are photodiodes or phototransistors. However, any light detecting means, e.g., avalanche, photo-multiplier tube, etc. is not beyond the scope of the present disclosure.

In some embodiments where light emitting diodes emit different wavelengths, photodetectors can be modified to accommodate the detection thereof. For example, photodetectors can be covered with different optical filters.

In particular, photodetectors 130 can be covered with dichroic filters, at least in part. A dichroic filter, thin-film filter, or interference filter is a very accurate color filter used to selectively pass light of a small range of colors while reflecting other colors. By comparison, dichroic mirrors and dichroic reflectors tend to be characterized by the color(s) of light that they reflect, rather than the color(s) they pass.

While dichroic filters are used in the present embodiment, other optical filters are not beyond the scope of the present invention, such as, interference, absorption, diffraction, grating, Fabry-Perot, etc. An interference filter consists of multiple thin layers of dielectric material having different refractive indices. There also may be metallic layers. In its broadest meaning, interference filters comprise also etalons that could be implemented as tunable interference filters. Interference filters are wavelength-selective by virtue of the interference effects that take place between the incident and reflected waves at the thin-film boundaries.

In other embodiments, a plurality of detectors is implemented, e.g., at least two for wavelength such that each of the pair of the plurality is wavelength specific. For example, there are at least two detectors (PD1, PD2) for every light emitting diode for a particular lambda.

In some embodiments an analog front-end 180 (AFE) is included. An AFE is a set of analog signal conditioning circuitry that uses sensitive analog amplifiers, operational amplifiers, filters, and application-specific integrated circuits as needed to interface with sensors to analog to digital converter and/or microcontroller. AFE 180 is in electrical communication with photodetector 150, as well as other optional sensors, such as, condensation sensor, temperature sensor, radiation sensor, and gas sensor, via traces through substrate 110.

In the present embodiment, photodetectors, light emitting diodes and AFE are packed together and then assembled to a PCB with other associated sensors. However, in other embodiments, they are integrated at the wafer level communicating through traces and vertical interconnect access (VIA) or through silicon VIA (TSV).

In some embodiments, AFE pin-out can be in electrical communication with a microcontroller unit (MCU), field programmable gate array (FPGA), bus, or other computer platform, such as, Arduino or Raspberry Pi, etc.—all of which are not beyond the scope of the present disclosure.

FIGS. 2A-2D are exemplary graphs representing scattered light as a function of angle, theta, and the resultant light receive at a photodetector, within an exemplary smoke detector, in accordance with some embodiments of the disclosure provided herein. Scattering intensity is dependent on scattering angle, $\lambda$, size & shape of the particle, and also the distance.

In FIGS. 2A-2D, we see scattering intensities for particle sizes 0.1-0.4 μm for FIGS. 2A-2D, respectively. One of ordinary skill in the art will observe that scattering intensities are also dependent on wavelength $\lambda$. In the present embodiment, two colors, blue and infrared, are used to demonstrate this dependency. Different colors can be used to optimize different types of fire detection.

FIGS. 3A-3D are exemplary graphs representing scattered light as a function of angle, theta, and the resultant light receive at a photodetector, within an exemplary smoke detector, in accordance with some embodiments of the disclosure provided herein. As discussed, scattering intensity is dependent on scattering angle, $\lambda$ size & shape of the particle, and also the distance.

Here scattering intensities for particle sizes 0.5-2 μm for FIGS. 3A-3D, respectively, are depicted. Again, one of ordinary skill in the art will observe that scattering intensities are also dependent on wavelength $\lambda$. In the present embodiment, two colors, blue and infrared, are used to demonstrate this dependency. Other colors are not beyond the scope of the present invention.

FIGS. 4A-4D are exemplary graphs representing scattered light as a function of angle, theta, and the resultant light receive at a photodetector, within an exemplary smoke detector, in accordance with some embodiments of the disclosure provided herein. As discussed, scattering intensity is dependent on scattering angle, $\lambda$ size & shape of the particle, and also the distance.

Scattering intensities for particle sizes 3-9 μm for FIGS. 4A-4D, respectively, are depicted. Again, one of ordinary skill in the art will observe that scattering intensities are also dependent on wavelength $\lambda$. In the present embodiment, two colors, blue and infrared, are used to demonstrate this dependency. Other colors are not beyond the scope of the present invention. One skilled in the art will appreciate that the forward scattering begins to dominate as the particle size grows.

Figure 5A:
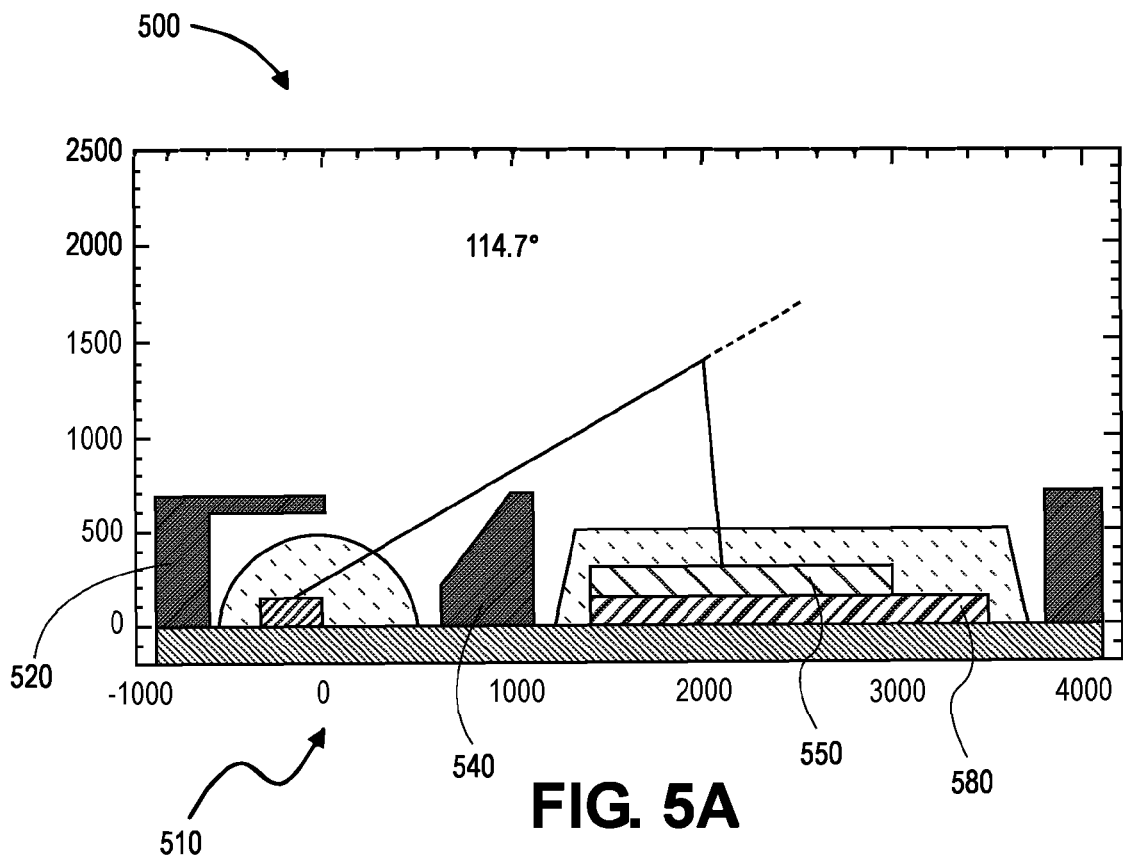
FIGS. 5A-5B are a side view of an exemplary smoke detector without packaging, in accordance with some embodiments of the disclosure provided herein.
Figure 5B:
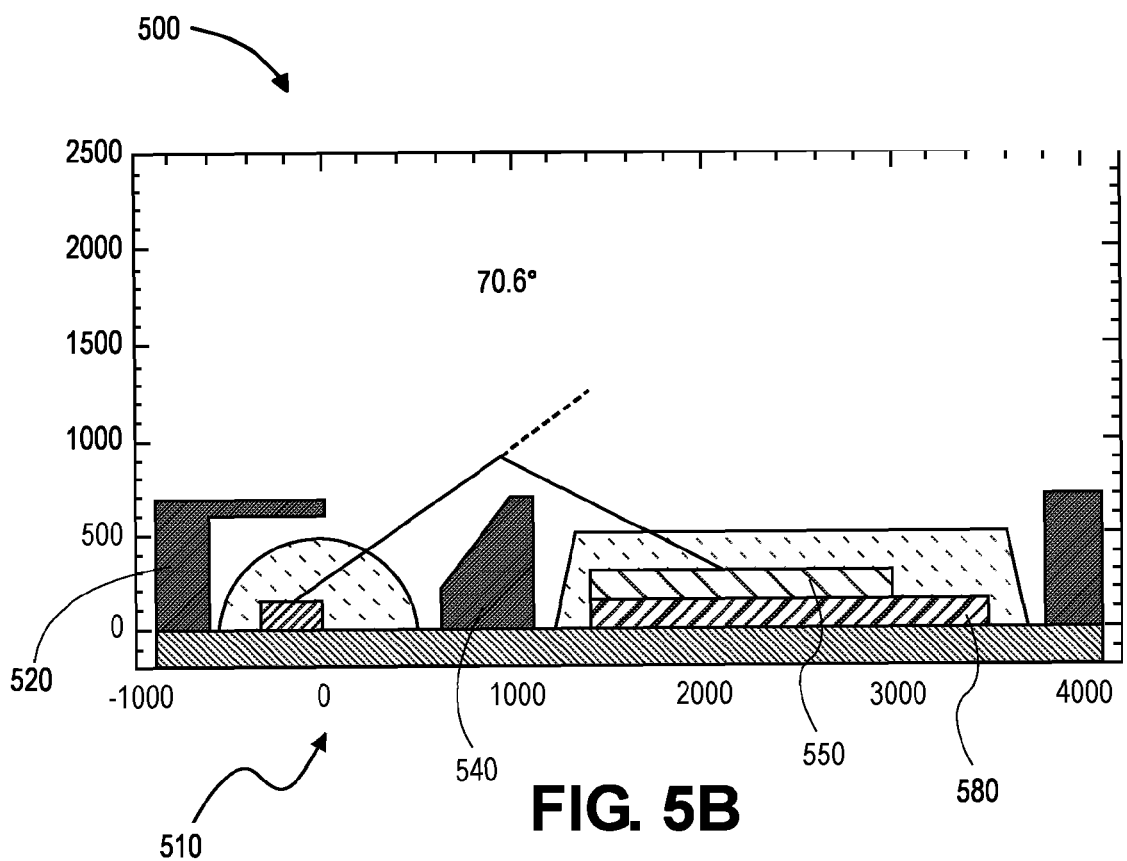

FIGS. 5A-5B are side views of an exemplary smoke detector 500 without packaging at differing scattering angles, in accordance with some embodiments of the disclosure provided herein. Optical smoke detector 500 comprises light emitting diode 530, substrate 510, septum 540, blocking member 520, AFE 580 and photodetector 550.

Turning to FIG. 5A, smoke detector comprises two barriers, septum 540 and blocking member 520, to shape the output light rays emerging from the light emitting diode 530 based light source. Septum 540 represents a coplanar barrier between the light emitting diode and photodetector. The barrier has a specific shape to allow tilted rays from the light emitting diode cavity that will traverse over the photodetector cavity which then scatter from the smoke particles. As will be appreciated with reference to the next figure, the scattering angle depicted in FIG. 5B will yield a higher signal than the scattering angle depicted in FIG. 5A.

Figure 6:
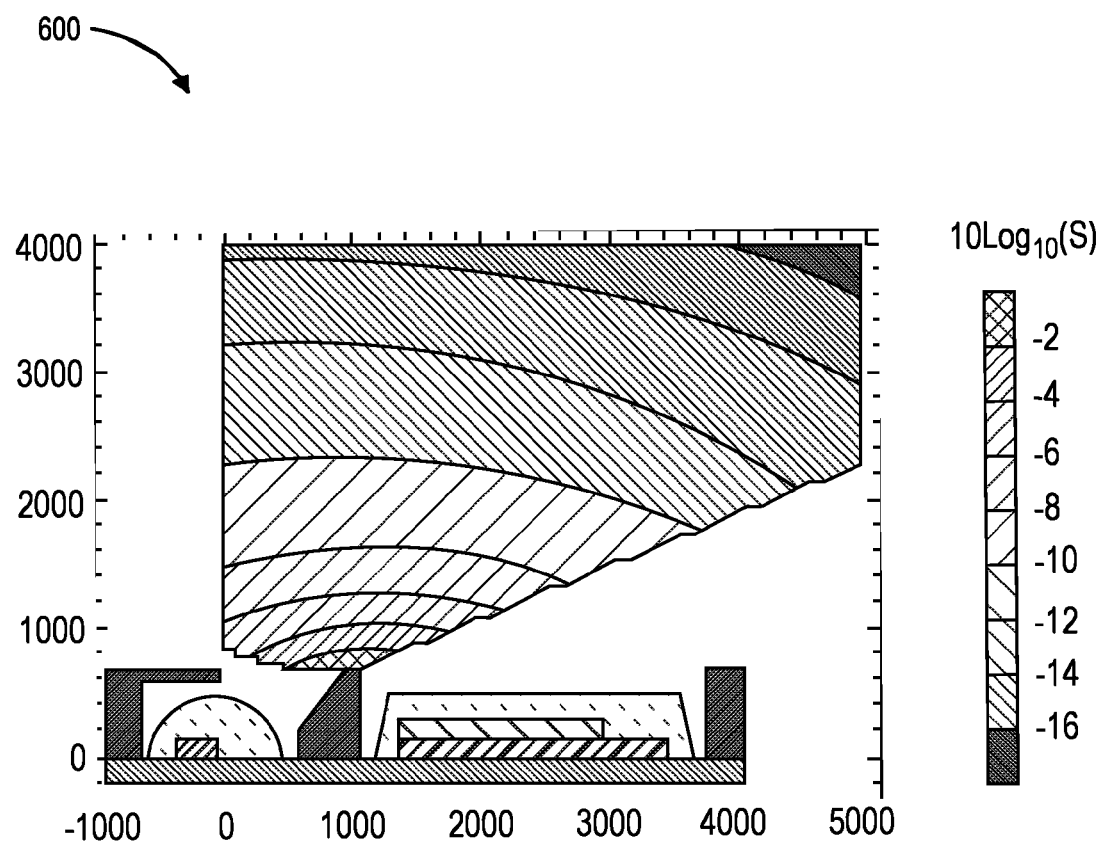
FIG. 6 is a log plot of the light collected from the scattering by 0.2 mm smoke particles, in accordance with some embodiments of the disclosure provided herein.

FIG. 6 is a log plot of the light collected from the scattering by 0.2 mm smoke particles, in accordance with some embodiments of the disclosure provided herein. FIG. 6 shows the computed heat map using equations (1) and (2). Note that the scale for the scattering is on the log scale and thus most of the scattering is coming from rays very close to the photodetector and light source. This scattered intensity plot depends on the particle size and the smoke type with different particle size distributions.

The small cone of light restricts the scattering angles from~65-140 degrees and contribution of each scattering angle to the total measured intensity depends on the smoke type and for each smoke type; both on the wavelength and the distances of the photodetector from the light source. Essentially it becomes more sensitive to the changes in the mean size (s) of the particle distributions from two different smoke types.

Figure 7:
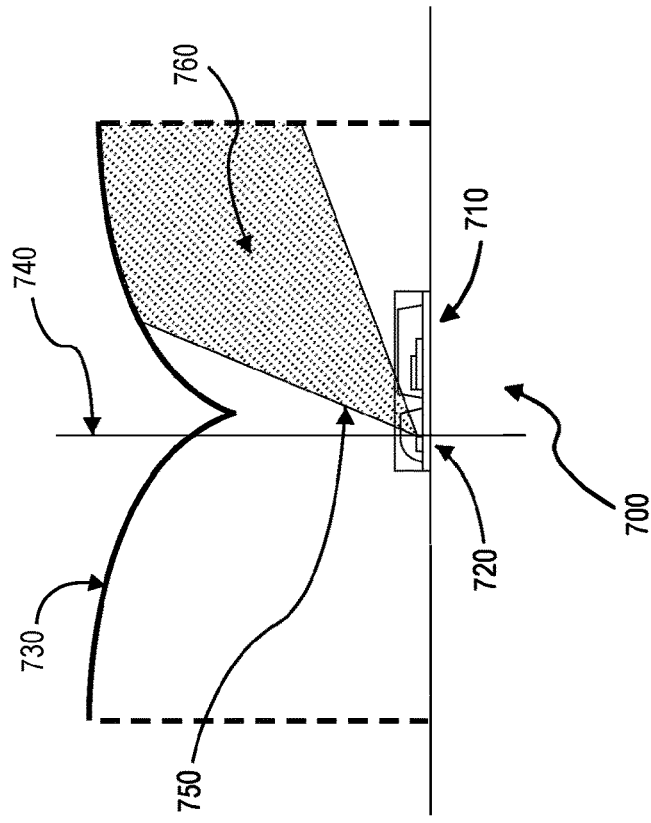
FIG. 7 demonstrates the effect of the cap alignment with respect to blocking member and resultant light path in an exemplary smoke detector, in accordance with some embodiments of the disclosure provided herein.

FIG. 7 demonstrates the effect of the cap alignment with respect to the blocking member and resultant light path in an exemplary smoke detector, in accordance with some embodiments of the disclosure provided herein. Optical smoke detector 700 comprises chamber 730, and substrate 710.

FIG. 7 shows how the shaping of the light beam 760 shown in FIG. 1 and FIGS. 5A-5B improves background light scattering from the enclosing chamber 730. In the above identified related patent applications, we describe a chamber placed around the module nearby surfaces to reduce the light reflected from the module.

With the blocking member and septum shaping light cone, we can place the module to minimize reflection from the "tip" of the chamber 730 and have most of the light reflected away from the photodetector. This reduces the background scattering. This is achieved by offsetting the tip of the chamber 730 from the orthogonal line 740 of the light emitting diode. In practice, a large amount of scattering is received from the tip of the chamber 730.

Figure 8:
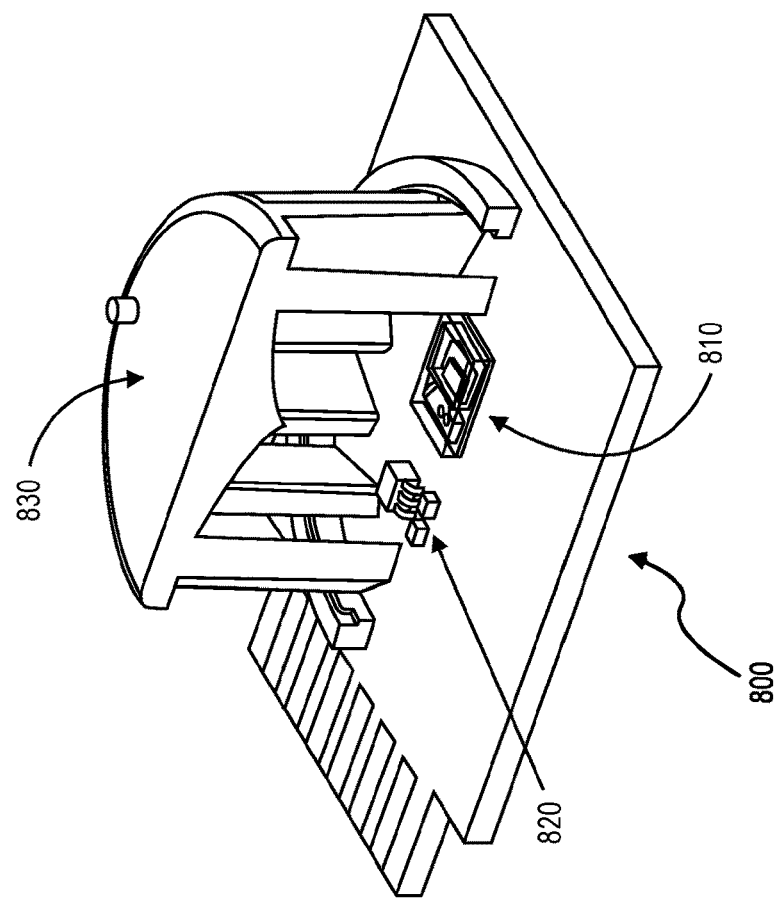
FIG. 8 is an isometric view of an exemplary smoke detector partial package cutaway, in accordance with some embodiments of the disclosure provided herein.

FIG. 8 is an isometric view of an exemplary smoke detector partial package cutaway 800, in accordance with some embodiments of the disclosure provided herein. Optical smoke detector 800 comprises chamber 830, and substrate 810.

Figure 9:
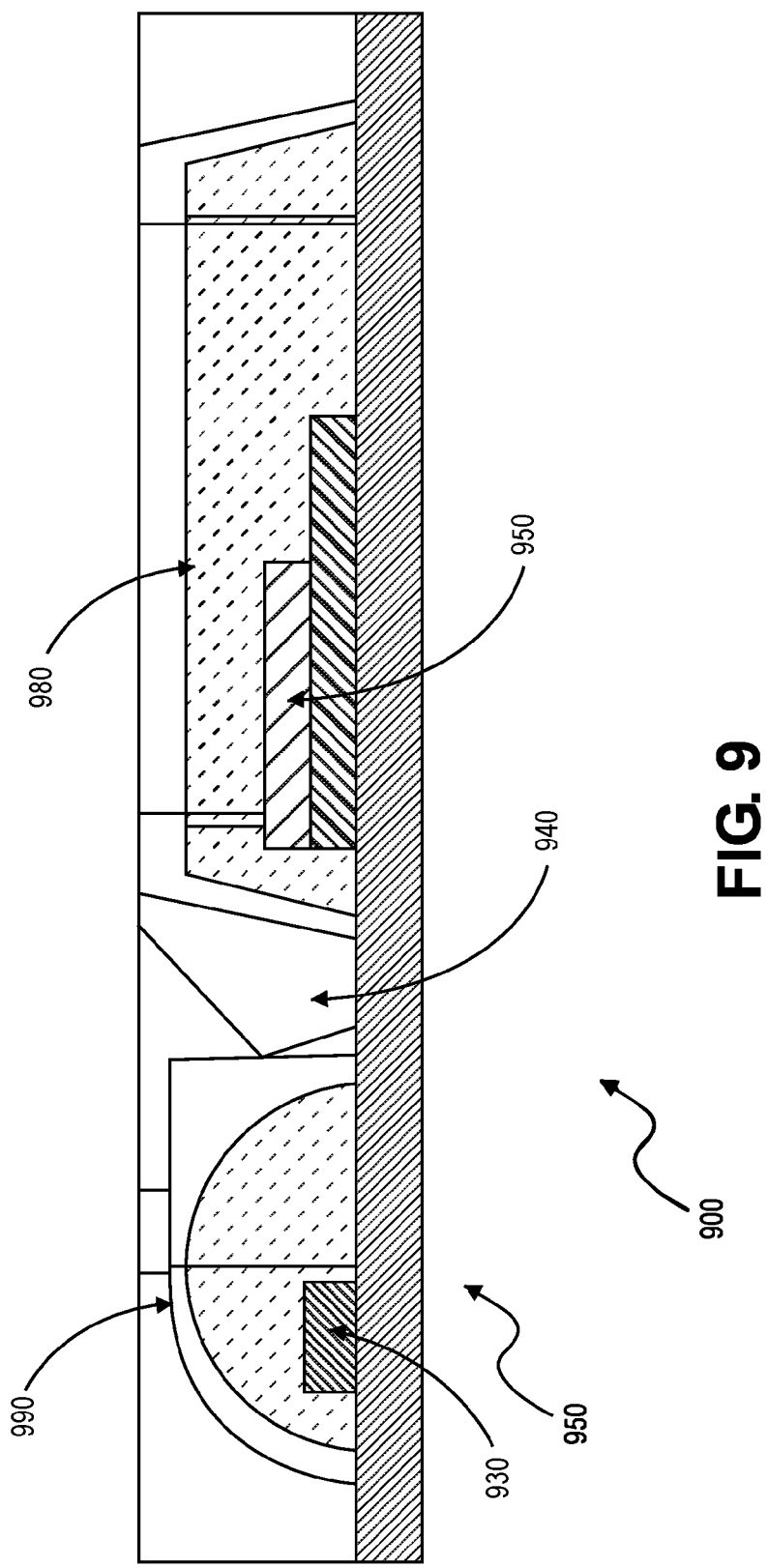
FIG. 9 are a side view of an exemplary smoke detector without packaging, in accordance with some embodiments of the disclosure provided herein.

FIG. 9 is a side view of an exemplary smoke detector 900 without packaging, in accordance with some embodiments of the disclosure provided herein. Optical smoke detector 900 comprises light emitting diode 930, septum 740, encapsules 790, 780 and photodetector 950.

Turning to FIG. 9, smoke detector comprises two barriers, septum 140 and blocking member above light emitting diode 930 to shape the output light rays emerging from the light emitting diode 930 based light source. Septum 940 represents a coplanar barrier between the light emitting diode and photodetector. The barrier has a specific shape to allow tilted rays from the light emitting diode cavity that will traverse over the photodetector cavity which then scatter from the smoke particles.

In one or more embodiments, encapsules 780, 790 are polymers which encapsulate the optical devices during packaging. They are largely transparent and protective, however, they can be tailored to suit a particular purpose, such as, optically filter light. The filters enumerated above all fall within the scope of the disclosure.

Figure 10:
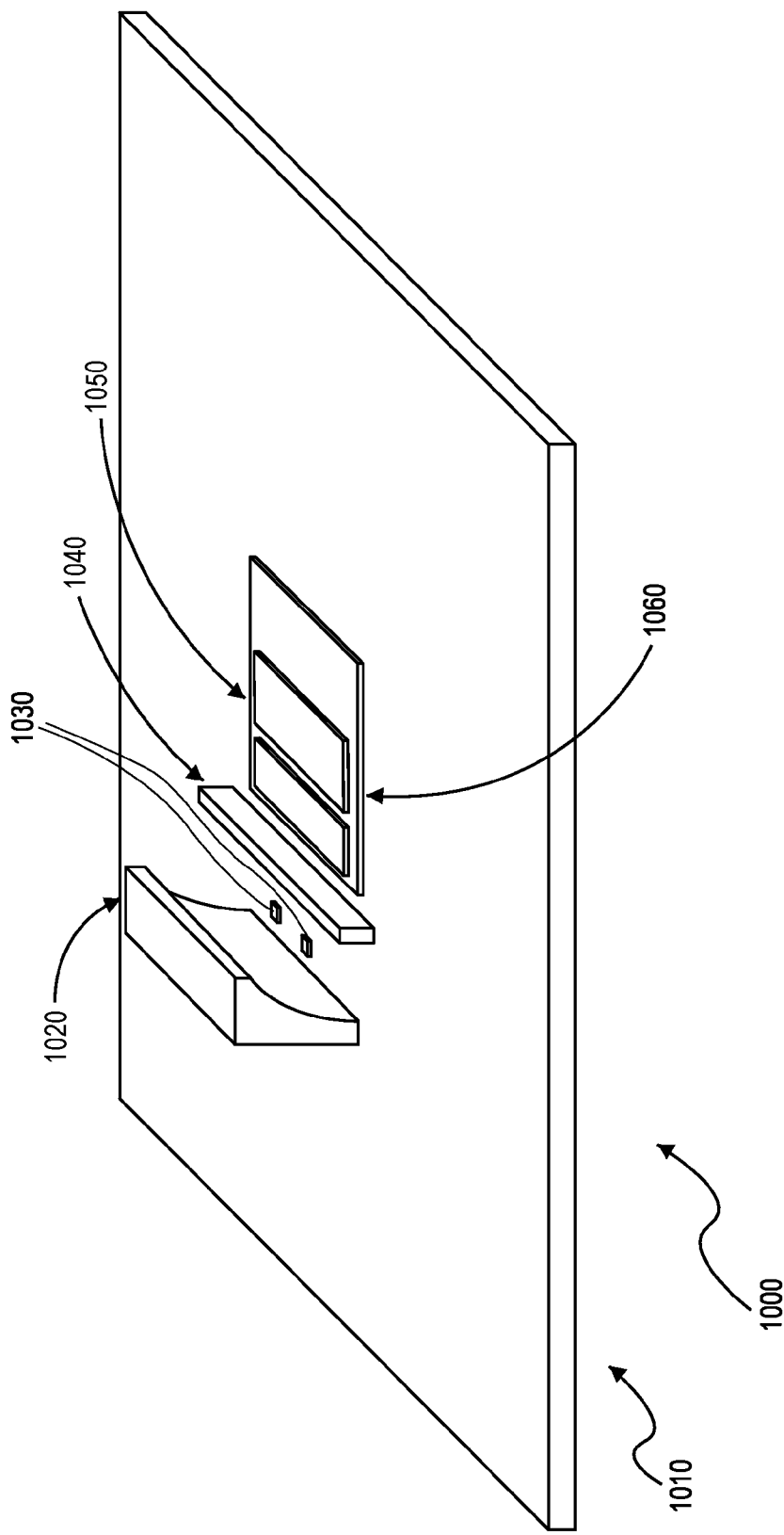
FIG. 10 is an isometric view of an exemplary smoke detector partial package, in accordance with some embodiments of the disclosure provided herein.

FIG. 10 is an isometric view of an exemplary smoke detector partial package, in accordance with some embodiments of the disclosure provided herein. Optical smoke detector 1000 comprises light emitting diodes 1030, substrate 1010, septum 1040, blocking member 1020, AFE 1060 and photodetectors 1050.

In the present embodiment, optical smoke detector 1000 comprises two light emitting diodes 1030, which can project different colors. Similarly, optical smoke detector 1000 comprises a plurality of photodetectors 1050. But this necessarily does not need to correspond to the number of light emitting diodes. For example, a single photodetector can be used with time multiplexing of the light emitting diodes. Furthermore, optical filers can be used such that a broad band light source may be used while no time multiplexing would be needed.

In one or more embodiments employing multiple photodetectors, thin film interference coating could be used to collect light at a predetermined incident angle. That is, detectors closer to the septum could have filters which would collect more normal (orthogonal) light. Whereas, detectors further away could be optimized to collect light of lower incident angles, such as, 45-60 degrees. That way, in practice, more weighting could be given to light that has been scattered close by.

While the present disclosure primarily focuses on smoke detectors, other devices are not beyond the scope of the invention. For example, gas detection and fire safety systems are entirely applicable. Particularly because there is usually more particulate matter present, there is a greater need for use in these. Vehicles, such as airplanes, busses, jets, trains and other public transportation are all within the scope of the present invention. Other closed environments would also have a need, e.g., underground bunkers, safe rooms, etc.

SELECT EXAMPLES

Example 1 provides an optical smoke detector comprising a first light source, a first photodetector disposed in substantially the same plane as the first light source, a septum disposed in between the first light source and the first photodetector, and a blocking member which substantially blocks orthogonally emitted light from the first light source.

In the first example, a circuit configured to receive electrical communication from the first photodetector and predominantly weight the scattering at angles less than 90 degrees to incident light rays.

Example 2 provides an optical smoke detector according to example 1 further comprising a second light source.

Example 3 provides an optical smoke detector according to example 2 further comprising a second light photodetector.

Example 4 provides an optical smoke detector according to example 3 wherein the second photodetector is disposed further away from the second light source relative to the distance between the first light source and first photodetector.

Example 5 provides an optical smoke detector according to example 4 wherein the circuit is further configured to more heavily weight the electrical communication from the first photodetector.

Example 6 provides an optical smoke detector according to example 5 wherein the first and second light sources emit light at different bandwidths.

Example 7 provides an optical smoke detector according to example 6 wherein at least one of the light sources is an LED.

Example 8 provides an optical smoke detector according to example 7 further comprising an optical filter.

Example 9 provides an optical smoke detector according to example 8 wherein the circuit is further configured to control the first and second light sources.

Example 10 provides an optical smoke detector according to example 9 wherein the second photodetector is disposed so as to capture light scattered at greater than 90 degrees.

Example 11 provides an optical smoke detector according to example 1 further comprising a lens configured to increase an optical collection efficiency of one or more of the photodetectors.

Example 12 provides an optical smoke detector according to example 1 further comprising one or more further blocking members configured to block light from at least one or more of the light sources.

Example 13 provides a method for smoke detection in an optical system, the method comprises emitting a first light from a first light source at a first wavelength, scattering the first light, collecting the first scattered light at a first photodetector disposed in substantially the same plane as the first light source, disposing a septum in between the first light source and the first photodetector, blocking first light which is orthogonally emitted from the first light source, receiving electrical communication from the first photodetector, and predominantly weighing the scattering at angles less than 90 degrees to incident light rays.

Example 14 provides the method for smoke detection in an optical system according to example 13 further comprising emitting a second light from a second light source at a second wavelength.

Example 15 provides the method for smoke detection in an optical system according to example 14 further comprising collecting the second scattered light at a second photodetector disposed in substantially the same plane as the second light source.

Example 16 provides the method for smoke detection in an optical system according to example 15 wherein the second photodetector is disposed further away from the second light source relative to the distance between the first light source and first photodetector.

Example 17 provides the method for smoke detection in an optical system according to example 16 further comprising more heavily weighing the electrical communication from the first photodetector.

Example 18 provides the method for smoke detection in an optical system according to example 17 further comprising optically filtering at least one of the first and second wavelength.

Example 19 provides the method for smoke detection in an optical system according to example 14 further comprising controlling the first and second light sources.

Example 20 provides an apparatus for detecting smoke in an optical system comprising a means for emitting a first light from a first light source at a first wavelength, means for scattering the first light, means for collecting the first scattered light at a first photodetector disposed in substantially the same plane as the first light source, means for disposing a septum in between the first light source and the first photodetector, means for blocking first light which is orthogonally emitted from the first light source, means for receiving electrical communication from the first photodetector, and means for predominantly weighing the scattering at angles less than 90 degrees to incident light rays.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein.

Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The above-described embodiments may be implemented in any of numerous ways. One or more aspects and embodiments of the present application involving the performance of processes or methods may utilize program instructions executable by a device (e.g., a computer, a processor, or other device) to perform, or control performance of, the processes or methods.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above.

The computer readable medium or media may be transportable, such that the program or programs stored thereon may be loaded onto one or more different computers or other processors to implement various ones of the aspects described above. In some embodiments, computer readable media may be non-transitory media.

Note that the activities discussed above with reference to the FIGURES which are applicable to any integrated circuit that involves signal processing (for example, gesture signal processing, video signal processing, audio signal processing, analog-to-digital conversion, digital-to-analog conversion), particularly those that can execute specialized software programs or algorithms, some of which may be associated with processing digitized real-time data.

In some cases, the teachings of the present disclosure may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe.

Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a personal digital assistant (PDA), a smart phone, a mobile phone, an iPad, or any other suitable portable or fixed electronic device.

Also, a computer may have one or more input and output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Computer-executable instructions may be in many forms, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

The terms "program" or "software" are used herein in a generic sense to refer to any type of computer code or set of computer-executable instructions that may be employed to program a computer or other processor to implement various aspects as described above. Additionally, it should be appreciated that according to one aspect, one or more computer programs that when executed perform methods of the present application need not reside on a single computer or processor, but may be distributed in a modular fashion among a number of different computers or processors to implement various aspects of the present application.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code may be executed on any suitable processor or collection of processors, whether provided in a single computer or distributed among multiple computers.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In some embodiments, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc.

Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure.

In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Interpretation of Terms

All definitions, as defined and used herein, should be understood to control over dictionary definitions, definitions in documents incorporated by reference, and/or ordinary meanings of the defined terms. Unless the context clearly requires otherwise, throughout the description and the claims:
- "comprise," "comprising," and the like are to be construed in an inclusive sense, as opposed to an exclusive or exhaustive sense; that is to say, in the sense of "including, but not limited to".
- "connected," "coupled," or any variant thereof, means any connection or coupling, either direct or indirect, between two or more elements; the coupling or connection between the elements can be physical, logical, or a combination thereof.
- "herein," "above," "below," and words of similar import, when used to describe this specification shall refer to this specification as a whole and not to any particular portions of this specification.
- "or," in reference to a list of two or more items, covers all of the following interpretations of the word: any of the items in the list, all of the items in the list, and any combination of the items in the list.
- the singular forms "a", "an" and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present) depend on the specific orientation of the apparatus described and illustrated. The subject matter described herein may assume various alternative orientations. Accordingly, these directional terms are not strictly defined and should not be interpreted narrowly.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Elements other than those specifically identified by the "and/or" clause may optionally be present, whether related or unrelated to those elements specifically identified. Thus, as a non-limiting example, a reference to "A and/or B", when used in conjunction with open-ended language such as "comprising" may refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein, the term "between" is to be inclusive unless indicated otherwise. For example, "between A and B" includes A and B unless indicated otherwise.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(-f) as it exists on the date of the filing hereof unless the words "means for" or "steps for" are specifically used in the particular claims; and (b) does not intend, by any statement in the disclosure, to limit this disclosure in any way that is not otherwise reflected in the appended claims.

The present invention should therefore not be considered limited to the particular embodiments described above. Various modifications, equivalent processes, as well as numerous structures to which the present invention may be applicable, will be readily apparent to those skilled in the art to which the present invention is directed upon review of the present disclosure.

What is claimed is:

1. An optical smoke detector configured to detect a scattering of smoke particles comprising:
   a first light source having a top surface, the first light source configured to emit a first light in a conical shape in a direction normal to the top surface;
   a first photodetector having a top surface disposed in substantially a same plane as the top surface of the first light source;
   a septum disposed in between the first light source and the first photodetector;
   a barrier disposed directly above the top surface of the first light source which substantially blocks the first light emitted from the first light source in a center of the conical shape of the first light; and
   a circuit configured to:
      receive electrical communication from the first photodetector; and
      predominantly weigh the scattering at angles less than 90 and greater than 50 degrees to incident light rays;
   wherein the barrier forms an enclosing chamber over the first light source,
   wherein the enclosing chamber has at least a partially arcuate shape; and
   wherein the partially arcuate shape ends at least partially over the first light source to block vertical light emanating from the first light source.

2. The optical smoke detector of claim 1, further comprising a second light source and a second photodetector.

3. The optical smoke detector of claim 2, wherein the second photodetector is disposed further away from the second light source relative to a distance between the first light source and first photodetector, and wherein the circuit is further configured to more heavily weigh the electrical communication from the first photodetector than the second photodetector.

4. The optical smoke detector of claim 2, wherein the first light source and the second light source emit light at different bandwidths.

5. The optical smoke detector of claim 2, wherein the circuit is further configured to control the first light source and the second light source.

6. The optical smoke detector of claim 2, wherein the second photodetector is disposed so as to capture light scattered at greater than 90 degrees.

7. The optical smoke detector of claim 1, further comprising an optical filter.

8. The optical smoke detector of claim 1, further comprising a lens configured to increase an optical collection efficiency of the first photodetector.

9. The optical smoke detector of claim 1, further comprising one or more further barriers configured to block light from at least one or more of the first light source.

10. The optical smoke detector of claim 1, wherein at least a first portion of the enclosing chamber is cantilevered by a second portion of the enclosing chamber to be at least partially directly over the first light source.

11. The optical smoke detector of claim 1, wherein the septum forms a coplanar barrier disposed between the first light source and the first photodetector with two places facing the first light source.

12. The optical smoke detector of claim 1, further comprising a thin film interference coating disposed over the first photodetector.

13. A method for detecting scattered smoke particles, the method comprising:
   emitting a first light from a first light source at a first wavelength, the first light source having a top surface, the first light source configured to emit the first light in a conical shape in a direction normal to the top surface;
   scattering the first light;
   collecting first scattered light at a first photodetector having a top surface disposed in substantially a same plane as the first light source;
   disposing a septum in between the first light source and the first photodetector;
   blocking a portion of the first light which is emitted from the first light source via a barrier, wherein the portion of the first light that is blocked is directly above the top surface of the first light source in a center of the conical shape of the first light;
   receiving electrical communication from the first photodetector; and
   predominantly weighing the scattering at angles less than 90 degrees and greater and 50 to incident light rays;
   wherein the barrier forms an enclosing chamber over the first light source,
   wherein the enclosing chamber has at least a partially arcuate shape; and
   wherein the partially arcuate shape ends at least partially over the first light source to block vertical light emanating from the first light source.

14. The method of claim 13, further comprising:
   emitting a second light from a second light source at a second wavelength; and
   scattering the second light and collecting the second scattered light at a second photodetector disposed in substantially the same plane as the second light source.

15. The method of claim 14, wherein the second photodetector is disposed further away from the second light source relative to a distance between the first light source and first photodetector, and the method further comprises more heavily weighing the electrical communication from the first photodetector.

16. The method of claim 14, further comprising optically filtering at least one of the first wavelength and the second wavelength.

17. The method of claim 14, further comprising controlling the first light source and the second light source.

18. An optical smoke detector, comprising:
   a first light source and a second light source;
   a first photodetector disposed in substantially the same plane as the first light source;
   a second photodetector disposed further away from the second light source relative to a distance between the first light source and first photodetector;
   a septum disposed in between the first light source and the first photodetector;
   a blocking member which substantially blocks orthogonally emitted light from the first light source; and
   a circuit configured to:
      receive electrical communication from the first photodetector;
      predominantly weigh the scattering at angles less than 90 and greater than 50 degrees to incident light rays; and
      more heavily weigh the electrical communication from the first photodetector than the second photodetector;
   wherein the blocking member forms an enclosing chamber over the first light source,
   wherein the enclosing chamber has at least a partially arcuate shape; and wherein the partially arcuate shape ends at least partially over the first light source to block vertical light emanating from the first light source.

* * * * *